Nov. 26, 1957 J. H. BARTLETT ET AL 2,814,639
DIMETHYLOL-TRICYCLODECANOL ESTERS AND PROCESS
Filed Dec. 31, 1954
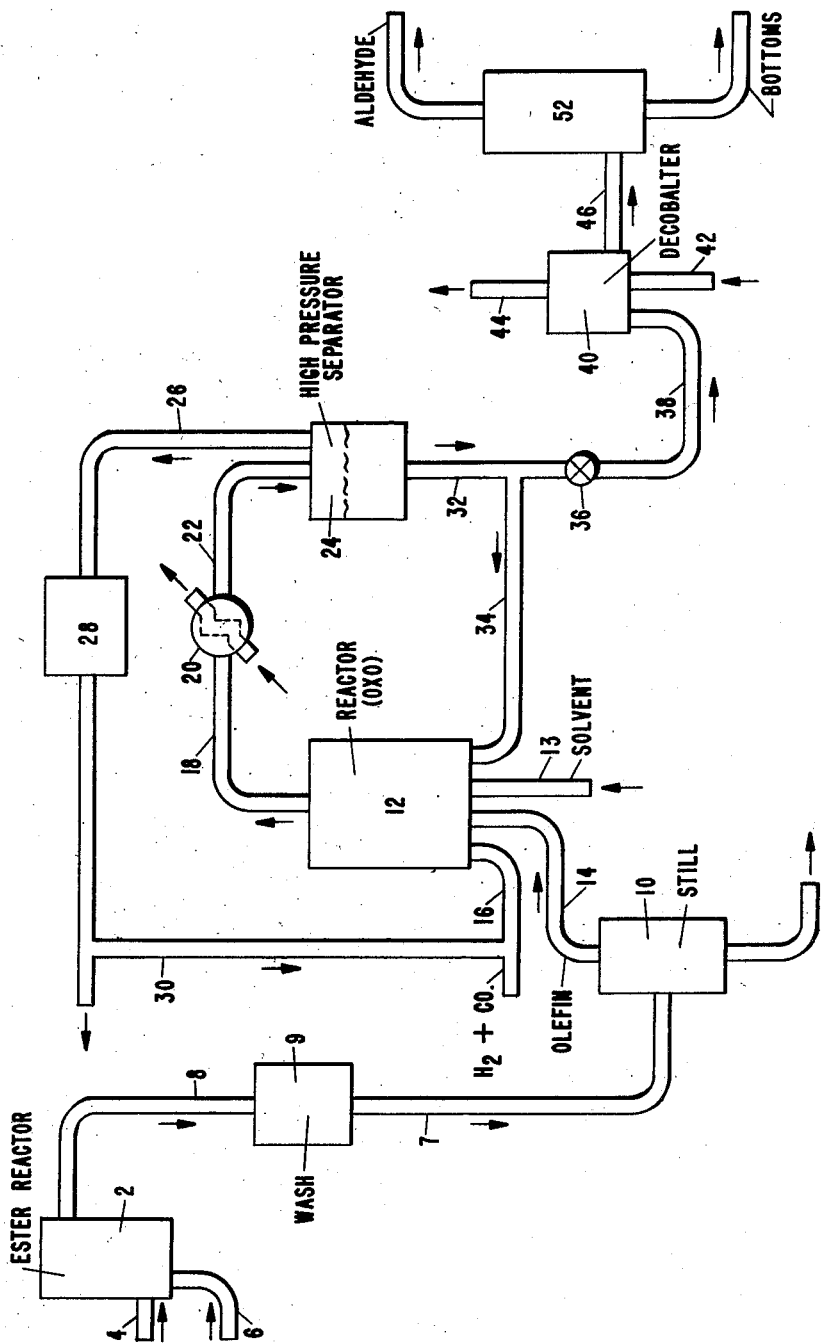
JEFFREY H. BARTLETT
ROBERT S. BRODKEY                    INVENTORS
PAUL V. SMITH JR.
BY *Richard H. Nagel* ATTORNEY United States Patent Office 2,814,639
Patented Nov. 26, 1957

2,814,639

DIMETHYLOL-TRICYCLODECANOL ESTERS AND PROCESS

Jeffrey H. Bartlett, Westfield, Robert S. Brodkey, Roselle, and Paul V. Smith, Jr., Westfield, N. J., assignors to Esso Research and Engineering Company, a corporation of Delaware Application December 31, 1954, Serial No. 479,118

7 Claims. (Cl. 260—488)

The present invention relates to the preparation of oxygenated organic compounds by the reaction of carbon monoxide and hydrogen with olefinic hydrocarbons in the presence of a carbonylation catalyst. More specifically, the present invention relates to the preparation of aldehydes having an additional functional group from diolefins, which compounds have exceptional properties as intermediates in chemical reactions.

The carbonylation, or Oxo reaction, though of only recent development, has proved itself to be a valuable tool in the synthesis of aldehydes and primary alcohols. By means of a reaction involving interaction of olefins, CO and $H_2$ at elevated temperatures and pressures of about 2000 to 4000 p. s. i. g. in the presence of a cobalt catalyst, aldehydes have been obtained in good yields, containing one more carbon atom than the olefin feed, and these aldehydes are readily reducible to the corresponding alcohol or oxidizable to the corresponding acid.

In marked contrast to the suitability of the monoolefins for this process, the diolefins are reported to be unsuitable for oxonation. The Oxo process, when applied to diolefins, instead of producing the expected dialdehydes and glycols, has yielded principally polymeric material, saturated mono-aldehydes and resins. This has been particularly true of conjugated diolefins. Oxonation of conjugated diolefins produces only minor amounts of dialdehyde and corresponding glycol; for the most part, a saturated mono-aldehyde resulting apparently from oxonation of one olefinic double bond and hydrogenation of the second olefinic linkage resulted.

In the past, irrespective of the type of diolefin subjected to oxonation, it has been found possible to oxonate but a single one of the olefinic linkages to produce saturated aldehydes, for, as pointed out, hitherto both olefinic linkages have participated in the reaction, even though saturated monoaldehydes were recovered. Unsaturated aldehydes or aldehydes having an additional functional group have not been found possible to prepare in good yields by this process from diolefins. It would be highly desirable to produce such polyfunctional aldehydes readily and cheaply and on a large scale, as would be possible by a method such as the Oxo reaction. Not only would the polyfunctional aldehyde or corresponding alcohol be an ideal intermediate in the production of polymeric and synthetic fibres, but it would be an intermediate in a host of synthetic reactions.

It is apparent that bi-functional compounds such as glycols, dibasic acids, olefinic alcohols, ester-alcohols, ester-aldehydes and the like, as well as their derivatives, are of great potential industrial value in a wide variety of applications. These materials are useful as intermediates for synthetic fibres, paints of the alkyd resin type, plasticizers, lube oil additives, and the like. These bi-functional compounds have hitherto, save for adipic and phthalic acid and their derivatives, not been generally industrially available, especially in the medium and higher molecular weight ranges. Due to the increasingly higher costs with increasing molecular weight, only the first few members of each homologous series of bi-functional compounds have found application in industry.

This invention has as an object, a process for preparing good yields of bi-functional compounds from diolefinic compounds by means of the aldehyde synthesis, or Oxo, reaction.

A further object of the present invention is to prepare plasticizers of outstanding properties from diolefins by means of the carbonylation reaction.

Other and further objects and results will appear hereinafter.

In accordance with the present invention, cyclic diolefins such as dicyclopentadiene and its homologs are initially reacted with a fatty acid, an alcohol or mercaptan. This procedure saturates one olefinic group, but, contrary to past processes, it does not eliminate a functional group; partial hydrogenation eliminates one functional group entirely. The diolefin is thus converted to esters of the mono or dicarboxy acids, by treatment with the corresponding carboxylic or alkanoic acid, such as formic, acetic, propionic, capric, palmitic, isooctanoic, isodecanoic, isotridecanoic, adipic, sebacic, and the like. The addition of these acids to the olefinic group is preferably catalyzed by condensation catalysts such as $H_2SO_4$, $HClO_4$, $BF_3$, $BF_3 \cdot H_3PO_4$ and similar strong mineral acids.

After the formation of the adducts the products are preferably purified by distillation or crystallization, and then subjected to oxonation. This includes reaction conditions of temperatures in the range of 225°–375° F. and pressures in the range of 1500–4500 p. s. i. g. A cobalt catalyst such as cobalt oleate, naphthenate, acetate, oxide etc. is employed. The resulting aldehyde compound is thereafter hydrogenated to the corresponding alcohol compound. Preferably, however, the aldehyde composition is converted to a high quality plasticizer.

The present invention will best be understood from the more detailed description hereinafter wherein reference will be made to the accompanying drawing which is a schematic illustration of a system suitable for carrying out a preferred embodiment of the invention. In the drawing and illustration, a more detailed practice of the invention for the preparation of aldehyde esters from specific diolefins is illustrated. For the purpose of illustration, dicyclopentadiene is employed as the diolefin feed. It will be understood that other diolefins having at least one olefinic linkage in a ring may be employed. Such compounds may also contain other substituents, such as oxygen, halogen, sulfur, nitrogen.

Referring now to the figure, the diolefin or doubly unsaturated cyclic compound is pumped through line 4 to reactor 2. Also charged to the reactor is the esterifying acid, such as acetic, formic, palmitic, etc., through line 6. A condensation catalyst, such as 70% $HClO_4$ may be added separately or along with the acid. The molar proportion of acid to diolefin is in the range of 0.5/1–5/1. The catalyst is added to the extent of .2–10% based on olefin. A temperature of 50° to 90° C. is maintained, and a residence time of 1 to 10 hours. If desired, an inert solvent such as petroleum ether or hexane may be employed.

The reaction product is withdrawn through line 8, water-washed in washing vessel 9, and passed to still 10, where the olefinic ester is recovered as an overhead stream through line 14.

The unsaturated compound is pumped through feed line 14 to the bottom portion of primary Oxo reactor 12. The latter comprises a reaction vessel which may, if desired, be packed with non-catalytic material such as Raschig rings, porcelain chips, pumice, and the like, and also, it may be divided into discrete packed zones or it may comprise but a single packed zone or even, if desired, may contain no packing. Concurrently through line 3, there may be injected into reactor 12, a solvent adapted to dilute the olefin. The solvent may be a hydrocarbon such as hexane or heptane which is readily separable from the final products. The proportion of solvent to olefins may be in the range of 1-2 to 5-1, and preferably is in the range of 2-1 to 5-1. However, solvent is not needed in every case.

To the reaction zone 12 there is added 0.1 to 3% by weight on the olefin, of cobalt naphthenate, stearate, or other high molecular weight cobalt soap. Other compounds of cobalt however may also be used. A gas mixture comprising $H_2$ and CO in the approximate ratio of 0.5 to 2 volumes of $H_2$ per volume of CO is supplied through line 16 to primary reactor 12 and flows concurrently through reactor 2 with the liquid feed. Reactor 12 is preferably operated at pressures of about 2000 to 4000 p. s. i. g., and at a temperature of about 225° to 375° F.

Liquid oxygenated reaction products containing some catalyst in solution, in part as the metal carbonyl, and unreacted synthesis gases are withdrawn overhead from an upper portion of high pressure reactor 12 and are transferred through line 18 to cooler 20 in which any conventional means of cooling is employed and from there, via line 22 to high pressure separator 24 where unreacted gases are withdrawn overhead through line 26, scrubbed in scrubber 28 free of entrained liquid and cobalt carbonyl and preferably recycled to reactor 12 via lines 30 and 16.

A stream of primary reaction products containing dissolved therein relatively high concentrations of cobalt carbonyl is withdrawn from separator 24 through line 32. A portion of the withdrawn stream may be recycled to reactor 12 via line 34 to improve selectivity and to aid in temperature control of the primary carbonylation stage. Furthermore, recycling of the primary reaction stage product returns a portion thereof for further contact with catalyst under reaction conditions.

The balance of the primary reaction product may be withdrawn through pressure release valve 36 and through line 38. The withdrawn liquid may comprise secondary reaction products as well as aldehydes and dissolved cobalt carbonyl. It is passed to catalyst removal zone 40 wherein by suitable heat treatment at about 200° to 400° F., the dissolved catalyst is decomposed. As aid to such decomposition, a stream of an inert gas such as hydrogen or a stream of steam or water may be admitted to zone 40 through line 42 to aid in stripping or decomposing and removing the evolved carbon monoxide resulting from the decomposition of the metal carbonyl. An exit gas stream comprising the purge gas and carbon monoxide may be removed from zone 40 through line 44 and used in any manner desired.

Liquid oxygenated products, comprising ester-aldehyde of dicyclopentadiene, now substantially free from carbonylation catalyst, is withdrawn from zone 40 through line 46. If desired, it may be passed directly to still 52 where the product may be recovered for use as a chemical intermediate, as in the manufacture of a plasticizer. Alternatively, the stream may be further processed to convert the aldehyde to the corresponding alcohol. Numerous other alternatives apparent to those skilled in the art may be carried out.

The present invention may be further illustrated by the following specific examples delineating conditions and results obtained when dicyclopentadiene is reacted in accordance with the process of the present invention.

EXAMPLE I.—FORMIC ESTER OF DICYCLOPENTADIENE AND DERIVATIVES

A. *Formic ester preparation*

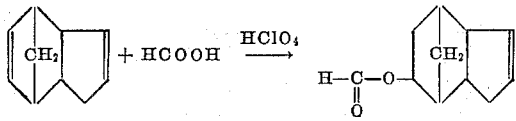

Dicyclopentadiene (1980 gms.) and formic acid (1050 gms.) were charged to the reactor. 16 gms. of 70% $HClO_4$ were added in 20 minutes. A second 16 gms. was added in 3 additional minutes. The temperature rise was rapid, increasing from 29 to 40° C. in 5 minutes and to 105° C. in 5 additional minutes. The crude product was diluted with petroleum ether and washed four (4) times with water. Isopropyl alcohol was used to aid separation. 1125 gms. of product was obtained. The product was distilled and 840 gms. of ester was obtained boiling from 240–249° C. (corrected to atmospheric). The ester No.[1] of 0.592 (105% ester) and a bromine No. of 85.2 (95% unsaturation) were obtained.

B. *Formic ester of dicyclopentadiene-aldehyde*

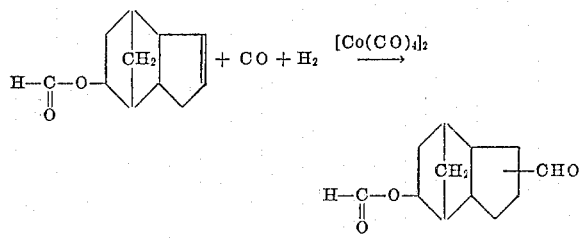

The distilled ester product was charged to a 3 liter rocking bomb autoclave. 100 ml. of 10% cobalt oleate in hexane was added as catalyst. The reaction temperature was 150–170° C. 3500 p. s. i. g. of $CO/H_2$:1/1 was used. 3200 pounds of synthesis gas were consumed. The total contact time was 24 hours. ⅓ of the crude aldehyde-ester was hydrogenated over a nickel catalyst to obtain the hydroxy-ester. The remainder of the crude Oxo product was distilled to recover the aldehyde-ester product. 260 gms. were obtained boiling between 150–160° C. at 4.5 mm. pressure or 310–325° C. (corrected to atmospheric). The product had an ester No. of 0.612 and a carbonyl No.[2] of 0.273. The two functional groups tend to interfere in the analytical testing procedure. The product is about 92% pure.

C. *Formic ester of dicyclopentadiene-alcohol*

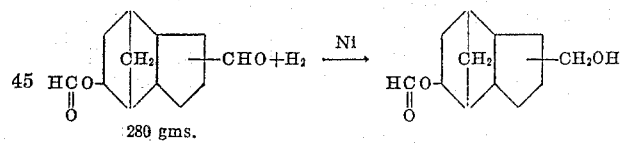
280 gms.

⅓ of the crude Oxo product was hydrogenated over nickel to the corresponding alcohol. The hydro product gave 171 gms. of hydroxy-ester boiling at 148° C. under 1 mm. pressure (340° C. corrected to atmospheric). The ester No. of 0.116 and hydroxyl No. of 0.875 indicates that the formate group has been altered to a secondary alcohol group in 70% of the product, giving a mixed product of 24% hydroxy-ester and 70% secondary-primary glycol.

EXAMPLE II.—ACETIC ESTER OF DICYCLOPENTADIENE AND DERIVATIVES

A. *Acetic ester preparation*

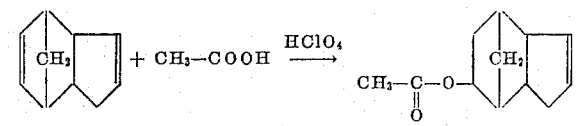

Dicyclopentadiene (1056 grams) and glacial acetic acid (720 grams) were charged to the reactor. The charge was heated to 100° C. and 10 gms. of 70% $HClO_4$ was added over a 5 minute period. In 5 additional minutes the temperature began to rise, slowly at first and then rapidly. The reaction was vigorous. The

---

[1] In this application, ester No. means centiequivalents of ester per gram of sample.
[2] Similarly, carbonyl No. in this application means centiequivalents of carbonyl per gram of sample.

maximum temperature of 147° C. was observed at 15 minutes from the time of first addition of HClO4. The crude products were diluted with petroleum ether and water washed four (4) times. Isopropyl alcohol was used to aid separation. 40 gms. of tar were obtained and 1110 gms. of usable product. The product was distilled and 790 gms. of ester was obtained boiling at 103° C. at 4.8 mm. pressure (250° C. corrected to atmospheric). An ester No. of 0.512 (98.3% ester) and a bromine No. of 80.8 (97% unsaturation) were obtained.

B. *Acetic ester of dicyclopentadiene aldehyde*

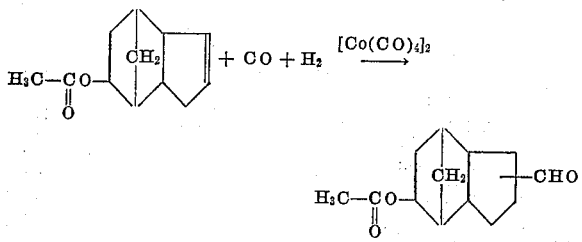

Distilled ester product (700 ml.) was charged to a 3 liter rocking bomb autoclave. 100 ml. of 10% cobalt oleate in hexane was added as catalyst. The reaction temperature was 150–155° C. 3500 p. s. i. g. of

CO/H2:1/1 was used. 2800 pounds of synthesis gas were consumed. The total contact time was 7 hours. ⅓ of the crude Oxo product was hydrogenated over nickel to obtain the hydroxy-ester. The remainder of the crude Oxo product was distilled to recover the aldehyde-ester product. 205 gms. were obtained boiling between 131–145° C. at 1 mm. pressure (325–350° C. corrected to atmospheric pressure). The product had an ester No. of 0.552 and a carbonyl No. of 0.271. The two functional groups tend to interfere in the analytical testing procedure. The product is about 91% pure.

C. *Acetic ester of dicyclopentadiene alcohol*

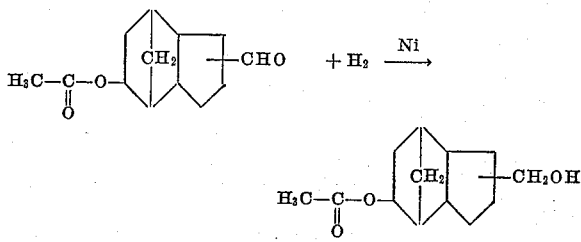

⅓ of the crude Oxo product was hydrogenated over nickel to the corresponding alcohol. The hydro product gave 84 gms. of hydroxy-ester boiling at 137–159° C. at 1.7 mm. pressure (320–340° C. corrected to atmospheric pressure). The ester No. of 0.410 shows 92% is the hydroxy-ester product. The hydroxyl No. of 0.466 shows that in addition to the 92% hydroxy-ester there is 5% of the secondary-primary glycol formed via the hydrolysis of the hydroxy-ester.

EXAMPLE III.—PALMITIC ESTER OF DICYCLOPENTADIENE AND DERIVATIVES

A. *Palmitic ester preparation*

(1) HClO4 (70%) *catalysts.*—Dicyclopentadiene (1264 gms.) and palmitic acid (2456 gms.) were charged to the reactor. 35 gms. of HClO4 were added over a 2 hour period. The temperature remained constant. The sample was washed with K2CO3, followed by several water washes. Distillation of the product gave 863 gms. boiling from 202–216° C. at 1.5–2.0 mm. pressure (418–425° C. corrected to atmospheric pressure).

(2) BF3—H3PO4 *catalysts.*—Dicyclopentadiene (1000 gms.) and palmitic acid (1731 gms.) were charged to the reactor. 65 gms. of BF3—H3PO4 catalysts were added during 1 hr. The temperature rose from 73° C. to 77° C. 70 grams additional were added over 30 minute period with no change in temperature. The reaction was held at 75° C. for 30 additional minutes (total time was 2 hours). The crude product was diluted with toluene, washed with NaOH, and water-washed 3 times. The solvent was stripped off on a steam bath, and the final product distilled giving 1260 gms. boiling at 180° C. at 4 mm. pressure (355° C. corrected to atmospheric pressure).

The products from the two reactions were combined and distilled to give 2075 gms. of product boiling between 197 and 225° C. at 0.7 to 1.4 mm. pressure (430–450° C. corrected to atmospheric pressure). The final product had an ester No. of 0.236 (88.5%) and a bromine No. of 41.3 (96.8%) unsaturation.

B. *Palmitic ester of dicyclopentadiene-aldehyde*

The distilled ester product was charged in two equal batches (1100 ml.) to two 3 liter rocking bomb autoclaves. To each 100 ml. of 10% cobalt oleate in hexane was added as catalyst. The reaction temperature was 160° C. 3500 p. s. i. g. of CO/H2:1/1 was used. 2200 pounds of synthesis gas was consumed in each reactor. The reaction time was 6 hours. The aldehyde product was distilled in a 1 liter molecular still.

EXAMPLE IV.—COMPOSITION OF THE FORMIC ESTER-ALDEHYDE PRODUCT

The crude Oxo reaction product resulting from the oxonation of the formic ester of dicyclopentadiene, consists to a large extent of an ester-aldehyde product which on hydrogenation is converted to an ester-primary alcohol product, as shown in Examples I–B and I–C above. However, in the course of the Oxo reaction, a certain amount of hydrogenation of aldehyde to the primary alcohol occurs and also, during the hydrogenation of the aldehyde to the alcohol, a certain amount of hydrogenation of ester to secondary alcohol occurs. To determine firmly the composition of the Oxo reaction product therefore, 82 grams of the hydroxy ester (Example I–C) 100 grams of KOH, 100 grams of water, and 200 cc. of absolute ethanol were charged to a liter flask and the charge refluxed for one hour. The alcohol was then removed by distillation and a glycol product recovered by ether extraction followed by distillation. 58 grams of a 98–99% pure glycol, having a hydroxyl number of 1.076 was recovered. The product had a boiling point of 154 to 156° C. at 1 mm. Hg (330 to 332° C. corrected). This glycol, C11H18O2, having a formula

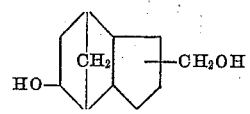

analyzed as follows:

| | O | H | O (direct) |
|---|---|---|---|
| Calc | 72.50 | 9.9 | 17.6 |
| Found | 72.65 | 10.1 | 17.3 |

EXAMPLE V.—PREPARATION OF THE DIMETHYLOL DERIVATIVE OF THE ACETATE ESTER OF HYDROXY - DIHYDRO DICYCLOPENTADIENE

The acetate ester of hydroxy dihydro dicyclopentadiene which had been oxonated to the aldehyde was treated with formaldehyde in which the following materials were used.

133 g. (0.6 m.) Oxo aldehyde of above ester
100 g. (1.2 m.) 37% formaldehyde solution
300 cc. 95% ethyl alcohol
80 g. 50% NaOH solution A 1 liter 4 necked flask equipped with a stirrer, condenser and thermometer was charged with the aldehydes and alcohol and then the NaOH solution was added gradually during ½ hour with the temperature maintained at 20° to 25° C. Stirring was continued for another 17½ hours at this temperature. The resulting mixture was diluted with water to which 200 g. of NaCl were added, then given 2 extractions with ethyl ether and 2 with amyl alcohol. On evaporation of the solvents a total yield of 132 g. of product was obtained. An attempt was made to distill this product at 0.5 mm. pressure but at 175° C. there was some indication of slight decomposition so was discontinued. This total product was used as such for esterification.

EXAMPLE VI.—PREPARATION OF THE NORMAL VALERATE ESTER OF THE DIMETHYLOL PRODUCT DERIVED FROM THE ACETATE ESTER OF HYDROXY-DIHYDRO DICYCLOPENTADIENE

A 1 l. 2 necked flask equipped with a thermometer and a water trap with a condenser was charged with:

113 g. dimethylol product from (Example V)
150 g. normal valeric acid
1 g. toluene sulfonic acid
200 cc. toluene The above mixture was refluxed for 12 hours at 133° to 165° C. and 2 hours at 165° to 190° C. during which time an aqueous layer of 24.6 cc. was removed from the trap. Then the resulting product was diluted with 500 cc. toluene and given 2 washes with 5% Na₂CO₃ followed by 3 water washes. After evaporation of the solvent the product was distilled under reduced pressure and a fraction of 157 g. was obtained at 189° to 235° C. at 0.4 mm. This fraction was redistilled under reduced pressure through a 6″ packed column during which 2 main cuts were taken as follows:

```
                                                   Grams
Cut No. 1 B. P. 173° to 196° C. @ 0.4 mm_____  61
Cut No. 2 B. P. 196° to 220° C. @ 0.4 mm_____  70
```

The ester No. of cut No. 1 was 0.575 ceq./gm. while cut No. 2 was 0.632 ceq./gm. The analysis of the latter is very close to the theoretical ester No. of the trivalerate which is 0.647 ceq./gm.

EXAMPLE VII.—PREPARATION OF THE DIVALERATE ESTER OF

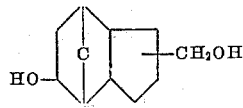

A 1 liter 2 necked flask equipped with a thermometer, water trap and condenser was charged with:

80.5 g. (0.37 m.) hydroxy methylol compound
6.3 g. (0.03 m.) formate methylol compound
170 g. (1.66 m.) normal valeric acid
2 g. toluene sulfonic acid
200 cc. toluene The above mixture was refluxed for 9 hours at 125° to 143° C. during which 19 cc. of an aqueous portion was trapped out. The mixture was then given 2 washes with 5% Na₂CO₃ followed by 3 water washes. After evaporation of most of the solvent on the steam bath the product was distilled. A heart cut of 125 g. was obtained having a boiling point of 160° to 172° C. at 0.35 mm.

Acid No. 0.012 ceq./gm.
Ester No. 0.561 ceq./gm.

The trivaleric (C₅) ester produced by reaction of the ester-aldehyde with formaldehyde followed by transesterification with valeric acid was tested as a plasticizer in vinyl compositions. For comparison, the vinyl composition was also plasticized with dioctyl phthalate, the most common and commercially accepted plasticizer on the market today. The data in the following table clearly show the superiority of the plasticizer of the invention over dioctyl phthalate. The ester of the triol is seen to be an excellent plasticizer, exceptionally heat stable, and low in volatility and extractability.

|  | Valeric ester of (structure) | Dioctyl phthalate |
|---|---|---|
| Original properties: | | |
| Tensile, p. s. i. | 2,975 | 2,850 |
| 100% modulus, p. s. i. | 2,105 | 1,895 |
| Elongation, percent | 285 | 290 |
| Aged 7 days at 100° C.: | | |
| Tensile | 3,040 | 2,485 |
| 100% modulus | 2,625 | 2,230 |
| Elongation | 260 | 175 |
| Percent tens.-elong. retained | 102-91 | 87-60 |
| Volatility after 7 days at 100° C.: | | |
| Percent plasticizer loss | 16.2 | 20.5 |
| White oil extraction after 7 days at 52° C.: Percent plasticizer loss | 5.6 | 9.2 |
| Dynamic modulus×10⁻⁴ | | |
| +25° C | 2.83 | 1.34 |
| +10° C | 9.9 | 4.0 |
| −5° C | 27.4 | 10.5 |
| −20° C | 29.8 | 21.4 |

*The 2 methylol groups may be attached to any 1 of the 3 carbons indicated by the asterisks.

What is claimed is:

1. A process for preparing oxygen-containing derivatives from a dicyclopentadiene hydrocarbon which comprises esterifying one of the double bonds of said dicyclopentadiene hydrocarbon with an alkanoic acid to form an olefinic ester in the presence of a strong mineral acid condensation catalyst, separating said ester from the reaction mixture, treating said ester with CO, H₂, and a cobalt carbonylation catalyst at temperatures in the range of 225–375° F. and pressures in the range of 1500–4500 p. s. i. g., separating an ester-aldehyde, and reacting said ester-aldehyde with formaldehyde in the presence of sodium hydroxide and ethyl alcohol to form the corresponding dimethylol derivative.

2. The process of claim 1 wherein said dicyclopentadiene hydrocarbon is dicyclopentadiene.

3. The process of claim 2 wherein said acid is formic acid.

4. The process of claim 2 wherein said acid is acetic acid.

5. A process for preparing a superior plasticizing agent which comprises reacting dicyclopentadiene with an alkanoic acid in a BF₃—H₃PO₄ esterification zone, separating an olefinic carboxylic ester from the resulting reaction mixture, reacting said ester with CO, H₂ and a cobalt catalyst at temperatures in the range of 225° to 375° F. and pressures in the range of 1500 to 4500 p. s. i. g. in a carbonylation zone, withdrawing an ester-aldehyde from said zone, reacting said ester-aldehyde with formaldehyde in the presence of sodium hydroxide and ethyl alcohol to form the corresponding dimethylol derivative, thereafter esterifying the reaction product with valeric acid, and recovering the trivaleric ester of

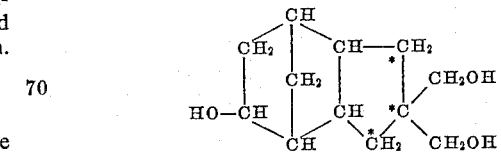

where the two methylol groups may be attached to any one of the three carbons indicated by the asterisks.

6. A compound having the formula:

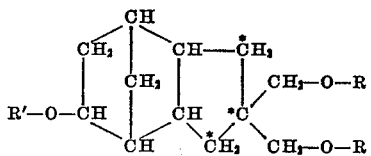

where R is selected from the group consisting of hydrogen and valeryl radicals, R' is an acyl residue of an alkanoic acid, and where the two —CH₂OR groups may be attached to any one of the three carbon atoms marked by asterisks.

7. As a composition of matter the ester

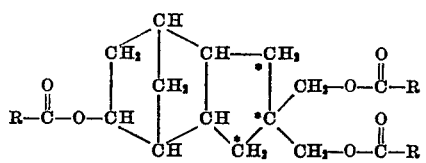

where R is a n-butyl radical and where the two

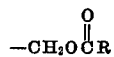

groups may be attached to any one of the three carbon atoms marked by asterisks.

References Cited in the file of this patent
UNITED STATES PATENTS

| | | |
|---|---|---|
| 2,395,452 | Bruson | Feb. 26, 1946 |
| 2,417,100 | Bruson et al. | Mar. 11, 1947 |
| 2,497,303 | Gresham et al. | Feb. 14, 1950 |
| 2,549,454 | Gresham et al. | Apr. 17, 1951 |
| 2,549,455 | Gresham et al. | Apr. 17, 1951 |
| 2,749,328 | Cline | June 5, 1956 |
| 2,769,843 | Feichtinger | Nov. 6, 1956 |